May 4, 1954　　　R. J. KUNS ET AL　　　2,677,170
CUTTING BIT
Filed June 16, 1951
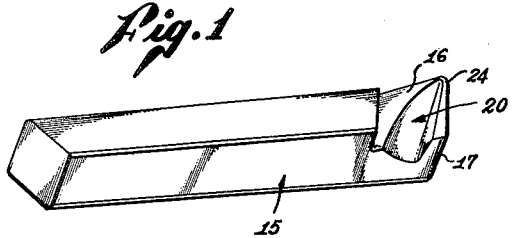
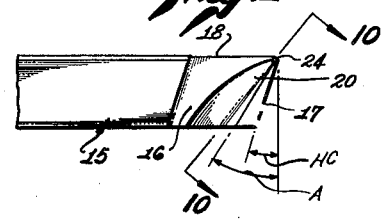
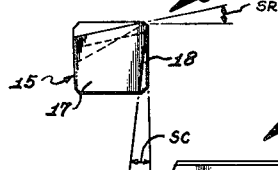
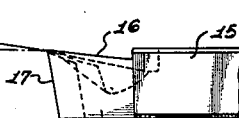
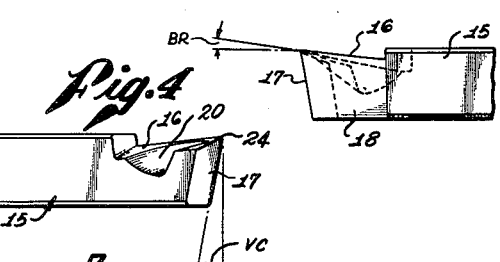
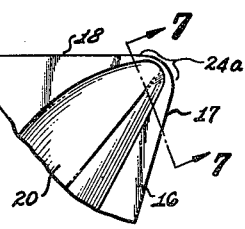
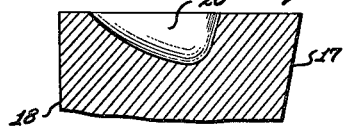
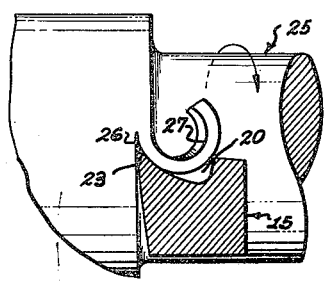
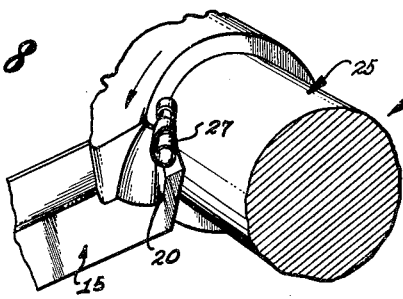
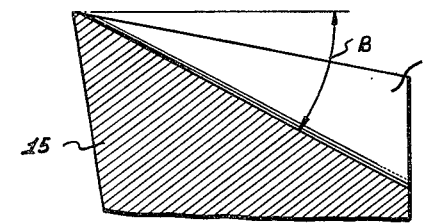
INVENTORS
ROBERT J. KUNS
BY CLAYTON R. HOYT
Fulwider & Mattingly
Attorneys Patented May 4, 1954

2,677,170

UNITED STATES PATENT OFFICE 2,677,170

CUTTING BIT

Robert J. Kuns and Clayton R. Hoyt,
Santa Monica, Calif.

Application June 16, 1951, Serial No. 231,942

5 Claims. (Cl. 29—95)

The present invention relates generally to machine tools, and more particularly, to a specially designed cutting bit for use in lathes, planers, shapers, and similar machines.

One of the principal difficulties encountered in the production of machined metal parts, particularly production in quantity, is that occasioned by the heat produced in removing metal from the work piece. Such heat tends to destroy the hardness of the cutting tool; tends to adversely affect the part being machined; presents in many instances a fire hazard; makes it difficult for the operator to machine tools to handle machined parts; and presents other similar obstacles to rapid and automatic production of machined parts.

The problem just discussed may be attacked in two ways. First by removing the metal or "chip" in such a manner as to produce a minimum of frictional heat, secondly by rapidly dissipating such heat as is produced so as not to accumulate such heat and unduly raise the temperature of the cutting bit.

The principal sources of heat occasioned by the machining of metal parts are (1) the actual separation of the chip from the parent metal; (2) the distortion of the metal forming the chip into a shape radically different from that in which it was disposed in the parent metal; and (3) the friction of the chip sliding against the cutting bit.

The present invention attacks the heat problem at each of the foregoing sources.

Bearing in mind the foregoing discussion, it is a major object of the present invention to provide a metal-cutting bit which produces less heat per given unit of metal removed than has been the case with bits used heretofore.

It is another object of the invention to provide a cutting bit of the class described in which such heat as is produced by the cutting operation is more rapidly dissipated than has been the case in bits used heretofore.

Still another object of the invention is to produce a cutting bit which is more rugged than bits heretofore used, and which is capable of use by relatively unskilled personnel according to more or less standard operating procedure.

A further object of the invention is to produce a bit of the class described which is easily and quickly sharpened.

A still further object of the invention is to produce a bit of the class described which can be used at a considerably higher cutting speed for a given depth of cut than has been the case heretofore.

The foregoing and additional objects and advantages of the invention will be apparent from the following detailed description thereof, consideration being given also to the attached drawings, in which:

Figure 1 is a perspective of a cutting bit embodying the present invention;

Figure 2 is a top plan view of the cutting end of the bit shown in Figure 1;

Figure 3 is a front end elevational view thereof;

Figure 4 is a rear side elevational view thereof;

Figure 5 is a front side elevational view thereof;

Figure 6 is an enlarged plan view of the cutting tip of the bit shown in Figure 1;

Figure 7 is an oblique elevational section taken on the line 7—7 in Figure 6;

Figure 8 is an enlarged elevational section of the bit taken near the tip and showing the operation of removing a chip from a revolving work piece;

Figure 9 is a perspective view of the operation illustrated in Figure 8; and

Figure 10 is an enlarged elevational section taken on the line 10—10 in Figure 2.

In the drawings, the reference character 15 identifies a lathe tool bit embodying the present invention, such bit being formed from a piece of square tool steel bar and having more or less conventional cutting surfaces ground in the forward end to form a cutting tip. The ground plane surfaces forming the cutting tip are the top surface 16, the front end surface 17, and a front side surface 18. The disposition of these surfaces is such that the tool has a side rake SR of approximately 8° (see Figure 3); a back rake BR of approximately 8°; a vertical front clearance VC of approximately 6°; a horizontal front clearance HC of approximately 14°; and a vertical side clearance SC of approximately 6°. A front-side cutting edge 24 is formed by the intersection of the top surface 16 with the front side surface 18, and the tip end is rounded at the intersection of the front end and side surfaces 17 and 18 to form a cutting point 24a having the usual small radius.

We have found that one of the principal sources of heat during machine cutting operations is, as above stated, due to the frictional contacts of the chip with the cutting tool. Accordingly, a considerable improvement in this regard may be achieved by avoiding unnecessary sliding contact of the chip with the tool. To this end, and for other purposes hereinafter to be discussed, the cutting bit 15 is formed with a relatively deep groove 20 of roughly U-shaped cross-section, positioned in the top cutting tip surface 16, originating a short distance from the cutting point 24a, and fanning out rearwardly in a diagonal direction, and terminating in the rear edge of the bit, as can be seen in Figure 1. The bottom of the groove is inclined with respect to the horizontal whereby it is deepest where it intersects the rear edge of the bit, becoming progressively shallower and narrower toward the forward cutting point 24a, as can be seen best in Figure 10. In the present embodiment, the forward edge of the groove makes an angle A of approximately 30° with the perpendicular drawn through the tip of the tool, and the bottom of the groove makes an angle B of approximately 30° with the horizontal.

One of the important features of the present tool is the narrow "land" 23 which is that portion of the top surface 16 which lies between the forward end of the groove 20 and the cutting point 24a. The operation of this land in forming the cutting chip is best seen in Figure 8, wherein it will be seen that a roughly triangular or wedge-shaped deposit of the metal being cut piles up or forms on the land 23, such wedge-shaped deposit being identified by the reference character 26 in Figure 8. Thus, as a work piece, for example, a cylindrical bar 25, is moved past the cutting tool 15, it is the wedge-shaped deposit 26 of the parent metal itself which separated the chip 27 from the stock material of the bar 25. As can be seen in Figure 8, the sliding contact of the chip 27 with the tool bit 15 is reduced to a minimum.

The width of the land 23 must be fairly accurately controlled with respect to the overall tool bit size, and it has been found that the following values achieve good results for an all-around heavy duty machine tool bit.

| Square Stock Size | Width of Land | Square Stock Size | Width of Land |
|---|---|---|---|
| ¼″ | .014 | ⅝″ | .018 |
| ⅜″ | .015 | ¾″ | .019 |
| ⁷⁄₁₆″ | .016 | ⅞″ | .020 |
| ½″ | .017 | 1″ | .021 |

It will be noted that the land 23 is relatively narrow at the point where the actual cutting takes place, and thus the wedge-shaped deposit 26 is relatively narrow and sharp, thus resulting in a relatively efficient cutting action, producing a minimum of heat. It will also be noted that the land, while fairly narrow, is supported or buttressed at both ends of its arcuate narrow portion by being joined with a widening part of the tool stock itself. Thus, the tendency for the narrow cutting land to be broken off or eroded away by the action of the moving chip is materially reduced. Also the arrangement just described makes for an efficient dissipation of heat by conduction into the shank of the tool bit.

A still further and important function of the groove 20 is the fact that it provides for a continuous circulation of air against the chip immediately adjacent the point at which the same is being removed from the parent metal. Due to the fact that the groove 20 has a free opening adjacent the back edge of the tool bit, and due further to convection and turbulence created by the moving chip and the heat at that point, a steady and substantial stream of cooling air is assured, thus improving the heat dissipation qualities of the tool.

When the cutting edge 24 becomes dull after continued use, the tool may be readily and quickly sharpened by lightly stoning the top surface 16.

It has been found that the most efficient operation of the particular embodiment shown and described herein is achieved when the longitudinal axis of the tool is arranged substantially perpendicular to the direction in which it moves into the work piece. It will be realized, however, that different orientations of the cutting tip surfaces are possible, whereby to achieve other types of cutting operations, as for example, boring operations and the like. The essential element of successful operation of the tool described herein is that the chip move substantially perpendicularly across the narrow part of the land 23, so as to achieve a minimum contact with the cutting tool 15 itself, and also to place the chip immediately above the groove 20 whereby the cooling action of the previously described air stream may have its maximum effect.

While the tool shown and described herein is fully capable of achieving the objects and providing the advantages hereinbefore stated, it will be realized that it is capable of considerable modification without departure from the spirit of the invention. For this reason, we do not mean to be limited to the specific form shown and described, but rather to the scope of the appended claims.

We claim:

1. A cutting tool having side, end, and top plane surfaces mutually intersecting to form side and front cutting edges intersecting at a cutting point, said top surface having a rear edge spaced from said side cutting edge and having a groove therein having relatively steep sides intersecting said top surface to define a distinct edge of said groove, said groove having an open end at said rear edge and a closed end closely adjacent said cutting point to form a relatively narrow land in said top surface between said point and closed groove end.

2. The tool of claim 1 further characterized by having lateral edges of said groove diverging from said closed end whereby the ends of said land are buttressed by relatively wider adjoining portions of said bit to strengthen said land.

3. The tool of claim 1 further characterized by having the intersection of said front and side surfaces and the closed end of said groove rounded to form a rounded cutting point whereby said land is arcuate.

4. The tool of claim 3 further characterized by having the lateral edges of said groove diverging from said closed end whereby the ends of said land are buttressed by relatively wider adjoining portions of said bit to strengthen said land.

5. The tool of claim 4 further characterized in that said groove is of increasing depth being deepest at said open end.

References Cited in the file of this patent

UNITED STATES PATENTS

| Number | Name | Date |
|---|---|---|
| 463,394 | Steen | Nov. 17, 1891 |
| 1,021,868 | Hartness | Apr. 2, 1912 |
| 1,276,081 | Kuhn | Aug. 20, 1918 |
| 1,414,520 | Martin | May 2, 1922 |
| 1,596,978 | Klopstock | Aug. 24, 1926 |
| 2,392,001 | Raper | Jan. 1, 1946 |